US008951634B2

(12) United States Patent
Jung et al.

(10) Patent No.: US 8,951,634 B2
(45) Date of Patent: Feb. 10, 2015

(54) FILLER MATERIAL FOR A FLOOR, AND METHOD FOR PRODUCING FILLER MATERIAL FOR A FLOOR

(76) Inventors: Mi-Suk Jung, Ansan-si (KR); Bo Jung Park, Ansan-si (KR)

( * ) Notice: Subject to any disclaimer, the term of this patent is extended or adjusted under 35 U.S.C. 154(b) by 343 days.

(21) Appl. No.: 13/148,290

(22) PCT Filed: Feb. 3, 2010

(86) PCT No.: PCT/KR2010/000662
§ 371 (c)(1), (2), (4) Date: Aug. 5, 2011

(87) PCT Pub. No.: WO2010/090444
PCT Pub. Date: Aug. 12, 2010

(65) Prior Publication Data

US 2011/0287263 A1 Nov. 24, 2011

(30) Foreign Application Priority Data

Feb. 5, 2009 (KR) ........................ 10-2009-0009437
Feb. 23, 2009 (KR) ........................ 10-2009-0014973
Jun. 24, 2009 (KR) ........................ 10-2009-0056686
Jan. 26, 2010 (KR) ........................ 10-2010-0007125

(51) Int. Cl.
*B32B 5/16* (2006.01)

(52) U.S. Cl.
USPC ........... 428/402; 428/403; 428/407; 428/326; 428/537.1; 523/122; 524/9; 524/13; 524/15; 524/16; 977/810

(58) Field of Classification Search
USPC ...................... 428/402, 403, 407, 537.1, 326; 523/122; 524/9, 13, 15, 16; 977/810
IPC .................................... E01C 13/08; B32B 5/16
See application file for complete search history.

(56) References Cited

U.S. PATENT DOCUMENTS 6,582,640 B2 * 6/2003 Willemse ...................... 264/119
6,964,986 B2 * 11/2005 Bachon et al. .................... 524/2
8,293,158 B2 * 10/2012 Rust et al. ................ 264/211.23
8,349,235 B2 * 1/2013 Pervan et al. ................ 264/115

FOREIGN PATENT DOCUMENTS

| | | |
|---|---|---|
| JP | 2003-034906 | 2/2003 |
| JP | 2004-036264 | 2/2004 |
| KR | 10-2008-0075350 | 8/2008 |
| KR | 10-0869585 | 11/2008 |
| KR | 100869585 | * 11/2008 |
| KR | 1020090013912 | 2/2009 |

OTHER PUBLICATIONS

International Search Report for PCT/KR2010/000662 Mailed Sep. 10, 2010.

* cited by examiner

*Primary Examiner* — Leszek Kiliman
(74) *Attorney, Agent, or Firm* — Patent Office of Dr. Chung Park

(57) ABSTRACT

The present invention relates to a filler material for a floor, comprising a natural base material and a mixture containing loess and a resin in powder or pellet form, as well as to a method for producing the filler material. The filler material of the present invention uses the natural base material and is thus environmentally-friendly and not harmful to the human body. Further, in the event rice husks are used as the natural base material, a person slipping on the floor is protected from burning caused by friction as the rice husks have a high moisture content. In addition, the loess contained in the filler material keeps the floor from becoming moldy and emits far infrared radiation, and therefore is beneficial to the human body. The resin emulsion of the filler material prevents the natural base material from generating dust, thus preventing dust from entering the human body via the respiratory organs of the human body. Further, the filler material of the present invention can be easily produced through a simple process. Therefore, mass production of the filler material of the present invention can be accomplished even without employing experts.

9 Claims, 2 Drawing Sheets

FILLER MATERIAL FOR A FLOOR, AND METHOD FOR PRODUCING FILLER MATERIAL FOR A FLOOR

RELATED APPLICATIONS

This application is a 371 application of International Application No. PCT/KR2010/000662, filed Feb. 3, 2010, which in turn claims priority from Korean Patent Application Nos. 10-2010-0007125, filed Jan. 26, 2010, and 10-2009-0056686, filed Jun. 24, 2009, and 10-2009-0014973, filed Feb. 23, 2009, and 10-2009-0009437, filed Feb. 5, 2009, each of which is incorporated herein by reference in its entirety.

TECHNICAL FIELD

The present invention relates to filler material for a floor and method for producing the filler material for a floor, more specifically, filler material for a floor enabling generation of dust to be reduced and method for producing such filler material for a floor.

BACKGROUND ART

In recent, as infants or children are encouraged to play out of doors, a case is increased that artificial turf is installed in schools or apartments. Normal method for installing the artificial turf is as follows. The artificial turf is laid down on ready-mixed concrete or tramped rubbles, and thereafter silica sands are scattered among the artificial turfs to secure it. Then, the filler material is laid down on the silica sands, thereby making the artificial turfs buried in the filler material.

For the filler material, rubber chips are generally used. The rubber chips are pulverized by sun light etc. to produce smashed powders. There is a problem that the smashed powders deposited on the floor fly around to enter the respiratory organs of the infants or children, thereby damaging their health. Furthermore, since the rubber chips generate much frictional heat and also have a low moisture content, a problem is present that when users slip very high risk of burning appears.

SUMMARY OF THE INVENTION

Technical Problem

An object of the present invention is to provide filler material for a floor enabling generation of dust to be reduced and method for producing such filler material for a floor.

Technical Solution

The present invention provides filler material for a floor that comprises natural base material and mixture containing loess and resin, and has powder or pellet form, and method for producing thereof.

According to another aspect of the present invention, the present invention provides method for producing filler material for a floor comprising a step of adding natural base material to loess water to produce a mixture; a step of drying the mixture; and a step of adding resin emulsion containing resin to the dried mixture and then mixing and drying them to produce filler material of powder form.

Advantageous Effects

The filler material for a floor and method for producing the filler material for a floor of the present invention have effects as follows.

First, since the natural base material is used, there is an effect that the filler material is environmentally-friendly and is not harmful to the human body. Furthermore, if the rice husks are used as the natural base material, since the rice husks are excellent in moisture content, a risk is greatly reduced that a person slipping on the filler material gets burned. Since the rice husks have a low temperature rising rate, the floor scattered with the filler material can be used without a risk of burning, even in summer or for a long period of use time. In addition, the rice husks have an excellent shock-absorbing property.

Second, when the natural fiber material is further added, the natural fiber material is entangled with the natural base material, whereby, even when it rains or a lot of water are permeated into the filler material, the natural base material is prevented from being carried away by the water, so the filler material is prevented from being damaged by the water.

Third, the loess has effects that it prevents inhabitation of mold, emits far infrared radiation and is beneficial to the human body. Furthermore, since the loess inhibits occurrence of atopy, infants or children can play on the artificial turf without any concern about atopy. In addition, since the loess is nonflammable, a combustibility of the filler material is reduced.

Fourth, since the resin emulsion prevents generation of dust from the natural base material, the dust is prevented from entering the human body via the respiratory organs. Furthermore, the resin emulsion inhibits generation of static electricity.

Fifth, since the process for producing the filler material is simple, an effect is obtained that production of the filler material is easy. Therefore, mass production of the filler material is possible even without employing experts.

DETAILED DESCRIPTION OF THE EMBODIMENTS

Figure 1:
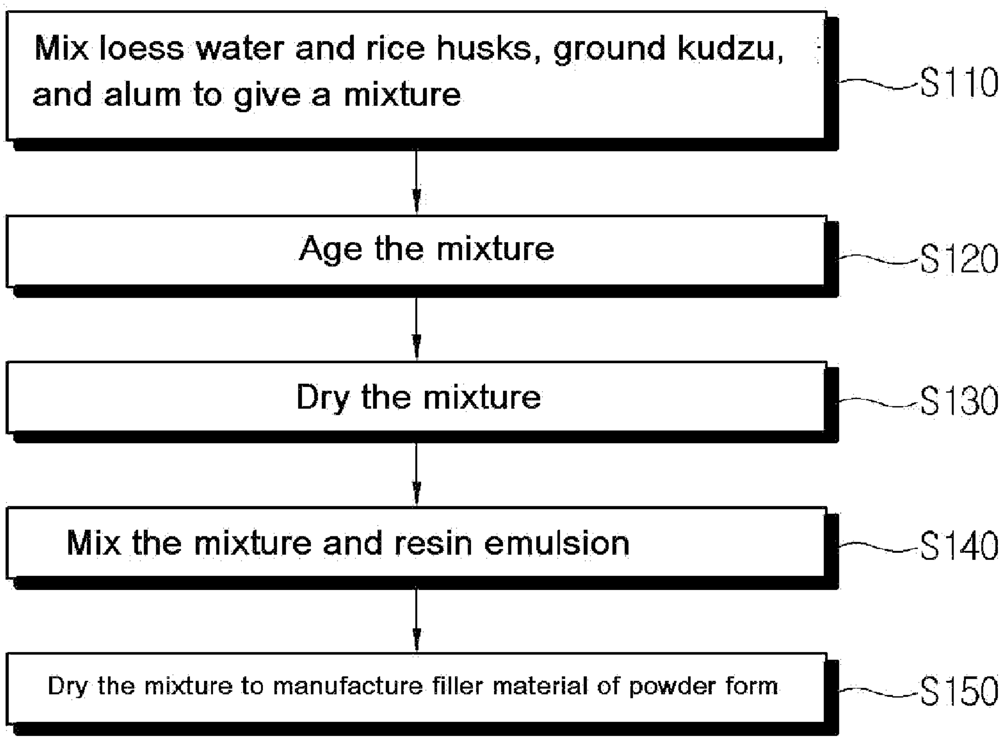
FIG. 1 is a flowchart showing steps of a method for producing filler material for a floor according to an example of the present invention.

FIG. 1 illustrates a flowchart showing steps of a method for producing a filler material for a floor (hereinafter, referred to as “filler”) according to the embodiment of the present invention. Referring to FIG. 1, loess water, natural base material, natural fiber material and adsorbing catalyst material are prepared, and then mixed with each other into a mixture (step S110). The natural base material is a basic material of the filler material, and natural material such as rice husks, cork or wood chips is used as the natural base material.

In the present invention, the rice husks are used as the natural base material. The rice husks are less afloat on the water than normal sawdust. Particularly, in the present invention, the rice husks may be formed from expanded rice husks. The expanded rice husks have a water-absorbing rate and amount slightly higher than normal rice husks. In the case that the filler material is used for the artificial turf, the rice husks absorb a portion of permeated water from the artificial turf. Therefore, since the weight of the rice husks is increased, a problem is reduced that the rice husks move into a sewer and the like afloat on the water.

The rice husks well drain the water as well as absorb the permeated water from the artificial turf, thereby preventing the water from being collected on the artificial turf. As mentioned above, it is preferable that a grain size of the rice husks is 1~5 mm, preferably 2~3 mm in order to prevent the rice husks from being afloat on the water and facilitate drainage.

The rice husks have an excellent shock-absorbing property. Therefore, when a person falls onto the artificial turf, the force is buffered which the person receives when crashing against the artificial turf, whereby the person is prevented from being injured.

Furthermore, the rice husks are known to emit far infrared radiation. In particular, as the artificial turf is installed in a place that gets much sunshine, amount of emission of far infrared radiation is further increased in summer. In addition, as the rice husks have low inflammability, damages resulting from occurrence of fire can be minimized. Furthermore, the rice husks are not apt to rot in nature, a possibility is very low that it rots over a long period of use time.

The rice husks are natural material that are not harmful to the human body and environmentally-friendly, and it may be utilized for fertilizer in disuse, and easily removed through incineration. The rice husks do not form the second industrial wastes, cause a pollution when processed and generate carbon, and accordingly there is no problem of environmental levy originally.

As mentioned above, the rice husks have high moisture content and excellent heat insulation property. Therefore, the temperature of the artificial turf may be kept low, and thus a possibility is greatly reduced that users slipping on the turf get burned.

The natural fiber material is entangled with the natural base material, thereby preventing the natural base material from floating when it rains. The natural fiber material is incorporated when the filler material is used out of doors, for example, in the filler material for the artificial turf. However, since, when the filler material is used indoors, there is no possibility of the filler material floating on the rain water, the natural fiber material may not be incorporated. In this case, effects are obtained in terms of production and cost.

For the natural fiber material, ground kudzu residues, flax, jute or ground coconut are used, and the present invention is not limited to them.

In the embodiments, the ground kudzu residues are used. The ground kudzu residues are entangled with the rice husks when it rains or a lot of water permeate into the filler material, thereby preventing the rice husks from being carried away by the water. The ground kudzu residues are produced by grinding the residues leaved behind after removal of the kudzu juice from the kudzu root.

The ground kudzu residues are in a condition that most of the moisture are removed from it, a lot of fibers remain in the ground kudzu residues. By the fibers of the kudzu residues the ground kudzu residues are easily entangled with the rice husks, thereby preventing the rice husks from flying away or being carried away by the water. Furthermore, since the ground kudzu residues have a high water absorptivity, if the ground kudzu residues absorb the water, its weight is increased, so that the rice husks are inhibited from floating on the water.

Furthermore, in the case that it does not rain, since the shock absorptivity of the kudzu residues is excellent, the kudzu residues together with the rice husks enhance shock absorptivity of the floor scattered with the filler material. The length of the ground kudzu residues is about 1~5 mm, preferably 2~3 mm.

The loess contained in the loess water stabilizes the rice husks and the ground kudzu residues by pressing the rice husks and the ground kudzu residues by its own weight. The loess contains lots of microbe beneficial to the human body and the environment, and thus inhibits inhabitation of the mold and the like to thereby provide the filler material for the artificial turf with a pleasant condition. Furthermore, the loess prevents infection of various bacteria in the filler material, and emits lot of far infrared radiation beneficial to the human body at a temperature from 30 to 60° C., and antioxidant activities of the rice husks is increased due to the far infrared radiation emitted from the loess. In addition, since the loess prevents occurrence of atopy, an effect is obtained that risk of occurrence of atopy is greatly reduced even if infants or children play on the floor scattered with the filler material. Furthermore, since the loess is nonflammable, a problem is greatly reduced that the filler material becomes combustible.

The adsorbing catalyst material performs a function of enabling the loess to be quickly and firmly adsorbed to the rice husks. By the adsorbing catalyst material the loess sticks to the surface of the rice husks. For the adsorbing catalyst material alum or NaCl may used, but the present invention is not limited thereto.

The mixture is aged for one to seven days (step S120). In the aging, the rice husks are dyed with the loess adsorbed to the rice husks. Since the dyeing loess stably sticks to the rice husks by means of the adsorbing catalyst material, a problem is greatly reduced that the loess smears the clothes. The period of the aging may be widely varied according to amount and kind of the mixture etc. Then, the aged mixture is dried to remove the moisture therefrom (step S130).

In the dried mixture, the rice husks are contained at 40~80 wt. % and the ground kudzu residues are contained at 10~50 wt. %. Furthermore, in the dried mixture, the loess is contained at 30~70 wt. %. If the wt. % of the loess is excessively high, the shock-absorbing effect of the filler material is reduced. Furthermore, since dust of the loess are fine, if the wt. % of the loess is excessively high, draining performance is reduced. Therefore, it is preferable to maintain the wt. % of the loess at or less than 70 wt. %.

Resin emulsion is mixed with the dried mixture (step S140). The resin emulsion is added to the mixture in order to prevent emission of the dust from the natural base material. The resin emulsion is made to contain the resin. For the resin synthetic resin or natural resin may be used, and at least one high polymer may be used which is selected from polysaccharide and its derivatives, polyethylene glycol based copolymer and its derivatives, polyacrylates, acrylic ester copolymer, aliphatic polyester based high polymer and its derivatives, natural or synthetic gum such as acasia gum, or polyvinyl based high polymer and its derivatives. The resin emulsion is diluted with the water for its use, and the diluted resin emulsion is formed by mixing 5~50 wt. % of the undiluted resin emulsion and 50~95 wt. % of the water.

The mixture wetted with the diluted emulsion is dried to produce the filler material in the form of powder from (step S150). In the dried filler material the resin emulsion is contained at 2~30 wt. % relative to total weight. The resin emulsion prevents emission of the dust from the filler material. Furthermore, the resin emulsion inhibits generation of static electricity from the filler material.

Though not shown in FIG. 1, in order to prevent the rot of the natural base material and natural fiber material, the natural base material and natural fiber material may be coated with anti-bacterial material. The anti-bacterial material enhances the anti-bacterial function together with the loess. The anti-bacterial material includes photocatalyst material, gold nanomaterial, silver nanomaterial etc. In particular, the photocatalyst material is material that removes various materials (VOC, bacteria, fine dust, sick house syndrome-causing material etc.) harmful to the human body by using light as energy source. If the photocatalyst material absorbs the light, electrons and holes are produced, and the electrons and holes thus produced participate in oxidation reaction and reduction reaction, respectively, and decompose the harmful material by means of these reactions.

For the photocatalyst material, various materials may be used, exemplary material is titanium dioxide. This titanium dioxide is plentiful in its resource and thus low-priced. Furthermore, the titanium dioxide is excellent in durability and abrasion resistance as the photocatalyst material, and as it is safe and nontoxic material as such, there is no concern about secondary pollution even when it is discarded A method for coating the natural base material and natural fiber material with the photocatalyst material is as follows. The aqueous photocatalyst solution containing the photocatalyst material. The anti-bacteria material is mixed at 0.05 wt. %~0.2 wt. % relative to the weight of mixed liquid of the mixture and resin emulsion.

After or before the mixture wetted with the diluted emulsion is dried, the mixture is immersed in the aqueous photocatalyst solution, and thereafter taken out to be dried. For the drying, natural drying and hot wind drying are possible. However, the method for forming the photocatalyst layer is not limited to the method described above. The photocatalyst layer may be formed by spraying the aqueous photocatalyst solution to the base material mixed in the diluted emulsion.

Figure 2:
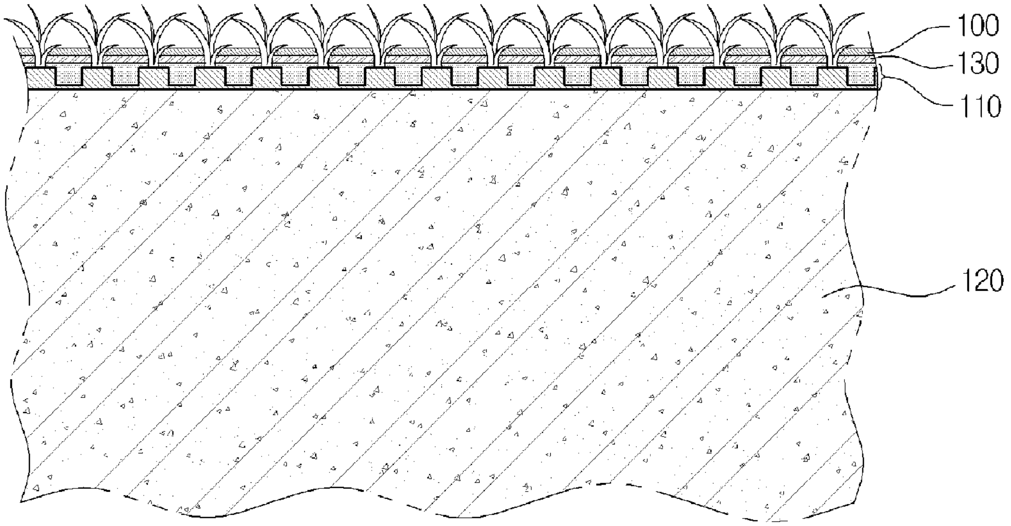
FIG. 2 is a schematic cross-sectional view showing a state that the filler material produced according to the steps of the method in FIG. 1 is applied to the artificial turf.

The filler material of powder form may be used as filler material for the artificial turf. Referring to FIG. 2, the figure illustrates a cross-sectional view showing a state that the filler material (100) is installed on the artificial turf. Referring to FIG. 2, the artificial turf (110) is laminated on the ground (120), and silica sands (130) are scattered between the artificial turfs (110) to perform a function of stably securing the artificial turf (110) to the ground (120) and erecting piles of the artificial turf. The filler material (100) is scattered on the silica sand (130), thereby being in the state of being scattered between the artificial turfs (110). In this way, the artificial turf is covered with the filler material (100) of the artificial turf (110) only except for a part thereof.

However, the filler material may be variously applicable other than to the artificial turf. That is, the filler material of powder form is processed into pellet from by use of pellet-producing machine, and thereafter may be used in a playground instead of sands. Urethane is generally used instead of sands, but the urethane has a problem that it produces much dust and has a high rate of generation of heat. However, the filler material of pellet form of the present example has effects that it has a very low rate of generation of the dust, and also is environmentally-friendly due to components such as the rice husks, the ground kudzu residues, the loess etc. and has a very low rate of generation of heat.

The present invention has been described with reference to the example illustrated in the drawings, this is mearly illustrative, and persons having ordinary skills in the art will understand that various modifications and another equivalent examples can be made from the example described above. Therefore, true technical protection scope of the present invention should be defined by technical concepts of the appended claims.

INDUSTRIAL APPLICABLY

The filler material for a floor of the present invention may be used as the filler material for artificial turf and the filler material for playground and the like.

What is claimed:

1. A filler material for a floor, comprising:
rice husks;
natural fiber material entangled with the rice husks; and
loess absorbed to the rice husks.

2. The filler material according to claim 1, further comprising:
resin emulsion added to the loess.

3. The filler material according to claim 2, wherein the resin emulsion is contained at about 2 wt. % to about 30 wt. %.

4. The filler material according to claim 1, wherein the natural fiber material includes ground kudzu residues, flax, jute or ground coconut.

5. The filler material according to claim 1, wherein the loess is contained at less than about 70 wt. %.

6. The filler material according to claim 1, further comprising anti-bacterial material for preventing the rot of the rice husks and the natural fiber material.

7. The filler material according to claim 6, wherein the anti-bacterial material comprises any one selected from a group consisting of photocatalyst material, gold nanomaterial and silver nanomaterial.

8. The filler material according to claim 6, wherein the anti-bacterial material is coated on the rice husks or natural fiber material.

9. The filler material according to claim 1, wherein the rice husks are contained at about 40 wt. % to about 80 wt. % and the natural fiber material is contained at about 10 wt. % to about 50 wt. %.

* * * * *